United States Patent [19]

Biton et al.

[11] Patent Number: 5,366,962
[45] Date of Patent: Nov. 22, 1994

[54] LOW CALORIE SWEETENER

[75] Inventors: Jacques Biton; Gerard Gellf, both of La Croix Saint Ouen; Jean-Marc Michel, Compiegne; Francois B. Paul, Toulouse; Pierre F. Monsan, Blagnac, all of France

[73] Assignee: Roussel Uclaf, Paris, France

[21] Appl. No.: 593,982

[22] Filed: Oct. 9, 1990

Related U.S. Application Data

[62] Division of Ser. No. 337,641, Apr. 13, 1989, Pat. No. 4,978,751.

[30] Foreign Application Priority Data

Apr. 14, 1988 [FR] France ................... 88 04944

[51] Int. Cl.$^5$ .................. C07H 3/00; C08B 37/00; A61K 31/715
[52] U.S. Cl. ........................... 514/54; 514/61; 536/123; 536/123.1; 426/658; 426/804
[58] Field of Search .................. 536/123, 123.1; 426/658, 804; 514/54, 61

[56] References Cited

U.S. PATENT DOCUMENTS

| 3,894,146 | 7/1975 | Tsuyama | 536/123 |
| 4,359,461 | 11/1982 | Nair et al. | 536/123 |
| 4,681,771 | 7/1987 | Adachi et al. | 426/658 |

FOREIGN PATENT DOCUMENTS 63-246389  10/1988  Japan ................... 536/123

Primary Examiner—John W. Rollins
Assistant Examiner—Everett White
Attorney, Agent, or Firm—Bacon & Thomas

[57] ABSTRACT

The present invention concerns the use of fructosyl oligosaccharides as low-calorie sweeteners, and the foods, dietetic products and drinks containing them.

8 Claims, No Drawings

LOW CALORIE SWEETENER

This application is a division of U.S. patent application Ser. No. 07/337,641 filed Apr. 13, 1989, now U.S. Pat. No. 4,978,751.

The present invention concerns the use of fructosyl oligosaccharides as low-calorie sweeteners, and the foods, dietetic products and drinks containing them.

Most of the sugar used in food comprises saccharose, which is a disaccharide containing a glucose and a fructose joined together by anomeric carbons.

In addition to its role as a sweetening agent in food, saccharose also has a role as an energy-giver, since the burning of 1 g of saccharose produces 4 Kcal. Due to its physical properties (melting temperature, solubility, ability to crystallize), it also plays a role as a structural agent and as a preservative in food.

Recently, there has been a strong trend toward reduced calorie content of foods, in order to combat obesity ("light" meals, "diet" drinks, etc.). Consequently, a demand has arisen for sugars which are low-calorie substitutes for saccharose.

It has already been discovered that some fructosyl oligosaccharides possess both an adequate sweetening capacity and slightly cariogenic and/or anti-caries properties (FR 2 450 876), but no mention is made of the caloric value of the products quoted.

Examples are known of sugars which are slightly cariogenic but known to be calorific, such as xylitol (J.J. BEEREBOOM CRC Critical Reviews in Food Science and Nutrition, May 1979, p. 401–413), leucrose or 5-0-alpha-(D-glucopyranosyl)D-fructo-pyranose (U.S. Pat. No. 4,693,974), "coupling-sugars" (TSUJI Y. et Coll., J. Nutr. Sci. Vitaminol., 32, 93–100, 1986), and fructosyl oligosaccharides produced by the HAYASHIBARA company (FR 2 559 490), which are slightly cariogenic but known to be calorific. Thus, the fact that a sugar is anti-cariogenic or slightly cariogenic does not necessarily mean that it is a low-calorie product.

Now it has been discovered that fructosyl oligosaccharides which are the subject of the present invention can also reduce, in an unexpected way, the daily calorie intake of a human or animal subject in comparison with saccharose.

One object of the present invention is therefore a method to reduce the total daily energy intake in a human or animal subject, characterized in that one or more fructosyl oligosaccharides containing from 3 to 8 carbohydrate units joined by beta bonds, replace all or some of the calorific sugars in products intended for food or dietetics.

The object of the method indicated above is in particular to improve the physical appearance of humans by encouraging weight loss.

The calorific sugars present in food are essentially saccharose, but other sugars such as fructose, glucose, and glucose/fructose syrup, optionally enriched with fructose, are also used.

The term "low-calorific sugars" means sugars which, in contrast to saccharose, are only slightly or not at all broken down by digestive enzymes (salivary amylases, pancreatic amylases, disaccharidases of the intestinal brush border).

The results given in examples 1 to 3 hereafter show that the oligosaccharides used in the method of the invention are not broken down by salivary and pancreatic amylases and are only slightly or not at all broken down by the disaccharidases in the intestinal brush border.

In view of these results, it can be expected that the method of the present invention reduces the total daily energy intake in a human or animal subject by 5 to 20%. This reduction can be achieved by a total or partial replacement of the calorific sugars (such as saccharose) present in food, by the fructosyl oligosaccharides according to the present invention.

The fructosyl oligosaccharides used in the method of the present invention are made up of simple carbohydrate units joined by beta bonds, the final carbohydrate unit being a fructose molecule.

The invention further concerns a method intended to reduce the total daily energy intake in a human or animal subject, wherein the fructosyl oligosaccharides used are trisaccharides.

A further object of the invention is the method defined above, characterized in that the trisaccharides used are preferably made up of one saccharose molecule and one glucose molecule, the glucoside units of which are joined either by a $beta_{1-2}$ bond so as to form sophorofructose, by a $beta_{1-3}$ bond so as to form laminaribiofructose, by a $beta_{1-4}$ bond so as to form cellobiofructose, or by a $beta_{1-6}$ bond so as to form gentiobiofructose.

A further object of the invention is the method defined above, wherein the trisaccharides used are made up of one saccharose molecule and one glucose molecule, the glucoside units of which are joined preferably either by a $beta_{1-4}$ bond so as to form cellobiofructose, or by a $beta_{1-6}$ bond so as to form gentiobiofructose.

An object of the invention is more particularly the method defined above, characterized in that the trisaccharides used are made up of one molecule of saccharose and one molecule of glucose, the glucoside units of which are joined by a $beta_{1-6}$ bond so as to form gentiobiofructose.

The results given in the experimental part show that the fructosyl oligosaccharides according to the present invention have organoleptic and physico-chemical properties (structuring ability, acid and thermic stabilities, solubility, viscosity, retention of water, and sweetening ability) which make them suitable for totally or partially replacing saccharose. Their non-acute toxicity at a does of 2 g/kg was demonstrated on a mouse.

On the other hand (like saccharose), they are non-reducing sugars, which do not give rise to Maillards' reactions.

All of these properties make them perfectly usable in food or dietetic products.

When used in food, dietetic products or drinks, oligosaccharides can be used alone, or (if necessary) in combination with other sweeteners, such as for example, saccharose, glucose, isomerized sugar, glucose/fructose syrup (whether or not enriched with fructose), maltose, sorbitol, maltitol, lactitol, xylitol, Aspartame ®, Acesulphame ®K, and saccharin. They can also be combined with filling agents, such as for example Polydextrose ®, starch, maltodextrin, Lycasin ® and lactose, colouring substances, perfumes and seasonings.

The invention therefore concerns food or dietetic products or drinks, characterized in that the calorific sugars that they contain are totally or partially replaced by one or more fructosyl oligosaccharides containing from 3 to 8 carbohydrate units joined by beta bonds.

The invention concerns in particular such products or drinks, characterized in that they contain at least 5% by weight (preferably 5% to %70 by weight) of one or more fructosyl oligosaccharides containing from 3 to 8 carbohydrate units joined by beta bonds.

The invention especially concerns such products or drinks which contain cellobiofructose, gentiobiofructose, laminaribiofructose and sophorofructose.

The fructosyl oligosaccharides of the invention can be used in all foods and drinks, in the form of syrup or powder, in freeze-dried form, in crystal form or in pieces.

The terms "food" and "drink" refer to food and drink in general, including sweets, jams, cakes, ice-creams and sorbets, creams, various desserts, pates, dressings, everyday dishes, carbonated or still drinks, food for domestic animals and in a general way any products taken orally, as well as substitute sweetening products containing fructosyl oligosaccharides.

In addition, an object of the invention is the use of fructosyl oligosaccharides containing from 3 to 8 carbohydrate units joined by beta bonds, in the preparation of pharmaceutical products, with the aim of reducing the total daily energy intake in a human or animal subject, and in particular the use of gentiobiofructose, laminaribiofructose, sophorofructose and cellobiofructose in preparing these pharmaceutical products.

These products are used, for example, to encourage weight loss in a human or animal subject, and in the treatment of obesity and of diabetes. Fructosyl oligosaccharides according to the invention can also be used as a sweetening excipient in toothpastes and in any medicaments intended to be taken orally (for example, syrups, lozenges, drinkable drops).

The invention concerns the use of fructosyl oligosaccharides containing from 3 to 8 carbohydrate units joined by beta bonds, in particular gentiobiofructose, laminaribiofructose, sophorofructose and cellobiofructose in a dietetic method consisting in the reduction of total daily energy intake.

In addition, one object of the invention is the use, as low calorific sugars, of fructosyl oligosaccharides containing from 3 to 8 carbohydrate units joined by beta bonds, in particular gentiobiofructose, laminaribiofructose, sophorofructose and cellobiofructose.

The fructosyl oligosaccharides used in the method of the invention can be prepared, for example, according to the process described by S. HESTRIN and G. AVIGAD (Biochem. J., 69, 388-398, 1958) by the action of a levanesaccharose (Enzyme Code E.C. 2.4.1.10) (enzyme nomenclature Academic Press. 1984-IUB) on a substrate solution containing saccharose and, alone or mixed, sugars such as gentiobiose, cellobiose, oligosaccharides with a degree of polymerization of 3 to 14 obtained by partial hydrolysis of the carbohydrate polymers, such as cellulose, the simple carbohydrate units of which are joined by beta bonds.

In this way all the fructosyl oligosaccharides used in the method of the invention are obtained alone or mixed, and in particular gentiobiofructose, cellobiofructose and fructosyl oligosaccharides with a degree of polymerization of 3 to 15.

The fructosyl oligosaccharides of the invention can also be prepared according to an inverse enzymatic hydrolysis process carried out in the presence of a strong concentration of substrate.

Patent No. WO 87/05936 describes the enzymatic synthesis of oligosaccharides by the use of such a process. However, the oligosaccharides prepared in the above patent are totally different from the fructosyl oligosaccharides according to the present invention, and the patent does not mention the use of saccharose as a carbohydrate residue acceptor as in the present invention.

In the present invention, a mixture made up of a concentrated solution of saccharose (used as a carbohydrate residue acceptor), and of simple sugars or carbohydrate polymers, is submitted to the action of one or more carbohydrolases.

The carbohydrolases used in the process, which belong to the glycosidase family, hydrolyze the beta bonds in carbohydrate polymers (E.C. 3.2.1. X) and more particularly cellulases or celluloyte complexes (E.C. 3.2.1.4), laminarinases (E.C. 3.2.1.6) beta-glucosidases (E.C. 3.2.1.21), endo-1,3-beta-glucosidases (E.C. 3.2.1.39), glucan-1,3beta-glucosidases (E.C. 3.2.1.58), glucan-endo-1,2beta-glucosidases (E.C. 3.2.1.71), lichenases (E.C. 3.2.1.73), glucan-1,4beta-glucosidases (E.C. 3.2.1.74), glucan-endo-1,6beta-glucosidases (E.S. 3.2.1.75) and oxocellobiohydrolases (E.C. 3.2.1.91), in concentrated solutions of saccharose, glucose, methyl beta-glucoside, cellobiose, gentiobiose, sophorose, laminaribiose, oligodextrins (the simple carbohydrate units of which are joined by beta bonds), and carbohydrate polymers the (simple carbohydrate units of which are joined by beta bonds).

All these carbohydrate residue donors are used alone or mixed.

The analysis of the fructosyl oligosaccharides formed according to one or other of the processes can be carried out for example by HPLC inverse phase on a Nucleosil C18 column.

The structure of the fructosyl oligosaccharides formed can be confirmed, for example, by NMR of the carbon 13 and of the proton after isolation, in a pure state, of these oligosaccharides by HPLC inverse phase on a Nucleosil C18 preparatory column. The eluent for the oligosaccharides which have a degree of polymerization of 3 to 5 is water, and for those which have a degree of polymerization greater than or equal to 5 the eluent is an appropriate mixture of water and methanol.

The fructosyl oligosaccharides used in the method of the invention can be isolated and purified, in a preparatory way, using for example chromatography on activated carbon powder, ion-exchange chromatography, starting with the mixture of sugars obtained by one of the processes.

The mixture of oligosaccharides can also be used just as it is.

The examples given hereafter illustrate the invention without however limiting it.

EXAMPLE 1

Hydrolysis of gentiobiofructose and cellobiofructose by the alpha amylases of human saliva and of the pancreas of a pig 1.1: Preparation of the gentiobiofructose or cellobiofructose solution The synthesis of gentiobiofructose or cellobiofructose is carried out by the action of a levane-saccharase on a substrate solution containing saccharose and gentiobiose (cellobiose) according to the process described by S. HESTRIN and G. AVIGAD.

The gentiobiofructose (cellobiofructose) formed is then isolated and purified from the reaction medium by semi-preparatory HPLC in inverse phase (Nucleosil C18 column-eluent: water), concentrated and then lyophilized.

The product is then dissolved is a 0.1M sodium phosphate buffer, (pH 7.0), so as to obtain a final concentration of 3 g/liter of fructosyl oligosaccharide.

1.2: Hydrolysis test with alpha amylase of human saliva

A mixture containing 2 ml of fructosyl oligosaccharide solution (prepared as above in 1.1) and 17.8 units of alpha amylase of human saliva (SIGMA Ref. A 0521) is incubated for 2 hours at 37° C.

After 2 hours, the reaction is stopped by heating. The glucose which has appeared is measured by the enzymatic method with glucose oxidase/peroxidase (Boehringer test Ref. 124036). In the same way, a control test is carried out with maltodextrins, type gluxidex 21 (Societe Roquette, France).

The results obtained are given in micromoles of glucose formed per enzyme unit and per hour.

TABLE 1

| Substrate | Activity of the alpha amylase of human saliva |
|---|---|
| Maltodextrins | 235 |
| Gentiobiofructose | 0 |
| Cellobiofructose | 0 |

1.3 Hydrolysis test with alpha amylase of the pancreas of a pig

A mixture containing 2 ml of fructosyl oligosaccharide solution (prepared as above in 1.1) and 19 units of alpha amylase from the pancreas of a pig (SIGMA Ref. A1278) is incubated for 2 hours at 37° C.

The reaction is stopped by heating. The glucose which has appeared is measured by the enzymatic method with glucose oxidase/peroxidase (Boehringer test Ref. 124036).

A control test is carried out with maltodextrins, type glucidex 21 (Societe Roquette, France).

The results are given in micromoles of glucose formed per enzyme unit and per hour.

TABLE 2

| Substrate | Activity of the alpha amylase from the pancreas of a pig |
|---|---|
| Maltodextrins | 224 |
| Gentiobiofructose | 0 |
| Cellobiofructose | 0 |

EXAMPLE 2

Hydrolysis of fructosyl oligosaccharides by a homogenate of the jejunum of a rat 2.1: Preparation of the fructosyl oligosaccharides The synthesis of the fructosyl oligosaccharides is carried out by the action of a levane-saccharase on a substrate solution containing saccharose and gentiobiose (cellobiose or a cellulose hydrolysate) according to the process described by S. HESTRIN and G. AVIGAD.

The oligosaccharides formed are purified by semi-preparatory HPLC (Nucleosil C18 column - eluent: water), then lyophilized.

Then the products are dissolved in a 0.05M sodium phosphate (buffer pH 6.0), so as to have molar concentration of 2.924 moles per liter.

2.2: Preparation of the homogenate of the jejunum of a rat 5 cm of jejunum is removed from a male Sprague Dawley rat (previously put on a diet for 25 hours) and rinsed with a solution of physiological serum.

The jejunum (weighing about 150 mg) is pulverized in the presence of 0.9% NaCl (w/v) using a "Polytron" type homogenizer, then the pulverized product is brought to 10 ml (with 0.9% NaCl solution).

2.3: Hydrolysis of the fructosyl oligosaccharides by the homogenate of the jejunum of a rat The reaction mixture containing 2 ml of fructosyl oligosaccharide solution and 2 ml of homogenate is incubated for 24 hours at 37° C., under magnetic agitation.

Samples are taken at regular intervals, and the intestinal enzymes are thermally inactivated.

A parallel test is carried out on a control solution containing saccharose.

The glucose released, over a period of time, is measured by the enzymatic method with glucose oxidase/peroxidase.

The degree of hydrolysis (DH) is calculated as follows and the results are presented in the following table:

$$DH\% = \frac{\text{glucose released } (\mu g)}{\text{total releasable glucose } (\mu g)} \times 100$$

TABLE 3

| Time (hours) | Saccharose DH % | Gentiobiofructose DH % | Cellobiofructose DH % |
|---|---|---|---|
| 0 | 0 | 0 | 0 |
| 8 hr 30 | 57.6 | 0 | 0 |
| 17 hr 30 | 66.7 | 0.4 | 3.7 |
| 24 hr 00 | 92.7 | 0.4 | 5.4 |

In a second series of tests, the evolution of the composition of the fructosyl oligosaccharide is followed over a period of time by inverse phase HPLC (Nucleosil C18 column -eluent: water), the control sugar still being saccharose.

The results are given in the following table.

TABLE 4

| Products tested | Time (hours) | Composition in carbohydrate %*[1] | | | | | |
| | | Glucose + Fructose | Saccharose | Gentiobio fructose | Cellobio fructose | DP₃F | DP₄F |
|---|---|---|---|---|---|---|---|
| Saccharose | 0 h | 0 | 100 | — | — | — | — |
| | 8 h 30 | — | — | — | — | — | — |
| | 24 h 00 | 96 | 4 | — | — | — | — |
| Gentiobio fructose | 0 | 0 | — | 100 | — | — | — |
| | 8 h 30 | 0 | ND*[2] | 100 | — | — | — |
| | 24 h 00 | 0.4 | ND | 99,6 | — | — | — |
| Cellobio fructose | 0 h | 0 | — | — | 100 | — | — |
| | 8 h 30 | 3.0 | ND | — | 97.0 | — | — |
| | 24 h 00 | 6.4 | ND | — | 93.6 | — | — |
| DP₃F | 0 h | 0 | — | — | — | 100 | — |
| | 24 h | 5 | — | — | — | 95 | — |

TABLE 4-continued

| Products tested | Time (hours) | Composition in carbohydrate %*[1] | | | | | |
|---|---|---|---|---|---|---|---|
| | | Glucose + Fructose | Saccharose | Gentiobio fructose | Cellobio fructose | $DP_3F$ | $DP_4F$ |
| $DP_4F$ | 0 h | 0 | — | — | — | — | 100 |
| | 24 h | 5 | — | — | — | — | 95 |

DP = Degree of polymerization

*[1]% HPLC = $\dfrac{\text{Surface of peak considered}}{\text{Surface represented by all the peaks}} \times 100$

*[2] undetectable

EXAMPLE 3

Hydrolysis of fructiosyl oligosaccharides by a homogenate of human jejunal mucous 3.1: Preparation of gentiobiofructose or cellobiofructose solutions.

The preparation is identical to that given in Example 2, paragraph 2.1.

3.2: Preparation of the homogenate of human jejunal mucous.

The jejunal mucous (about 40 mg) is homogenized in the presence of a 0.9% aqueous solution of NaCl (weight/volume) using a "Polytron" type homogenizer. The homogenate is then brought to 12 ml (with the 0.9% solution of NaCl).

3.3: Hydrolysis of gentiobiofructose or cellobiofructose by the homogenate of human jejunal mucous.

The reaction mixture containing 2 ml of fructosyl oligosaccharide solution and 2 ml of homogenate is incubated for 24 hours at 37° C. under magnetic agitation.

Samples are taken at regular intervals, and the intestinal enzymes are thermally inactivated.

A parallel test is carried out on a control solution containing saccharose.

The glucose released over a period of time is measured by the enzymatic method with glucose oxidase/peroxidase.

The degree of hydrolysis is calculated as follows and the results are presented in the following table.

$$DH \% = \dfrac{\text{Glucose released } (\mu g)}{\text{Total releasable glucose } (\mu g)} \times 100$$

TABLE 5

| Time (hours) | Saccharose DH % | Gentiobiofructose DH % | Cellobiofructose DH % |
|---|---|---|---|
| 0 hr | 0 | 0 | 0 |
| 10 hr | 57.1 | 0 | 0 |
| 24 hr | 88.0 | 0 | 0 |

Conclusion for Examples 1 to 3

As can be seen from tables 3 to 5, the results show that the fructosyl oligosaccharides are very slightly hydrolysed by the enzymes of the intestinal brush border of the rat and of man, unlike saccharose.

In addition, the results of Example 1 (presented in tables 1 and 2) show the total absence of hydrolysis by human salivary alpha amylase and alpha amylase of the pancreas of a pig.

It can be concluded that the fructosyl oligosaccharides are suitable as sweeteners with a low-calorific capacity.

EXAMPLE 4

A control raspberry sorbet containing saccharose was prepared according to the following recipe:

Raspberry sorbet (control):
200 g of saccharose
200 g of water
40 g of Cristal R glucose (Trade Mark CPC)
400 g of raspberries
2 g of apple pectin
1 tablespoonful of lemon juice
sugar syrup adjusted to 18 degrees Be Another raspberry sorbet was made in the same way as the control sorbet, except that the 200 g of saccharose was replaced by 200 g cellobiofructose, prepared according to the process described by S. HESTRIN and G. AVIGAD.

The operating conditions were strictly identical for the two tests.

According to a trained panel of 10 people, there was no significant difference, as regards sweetness in taste, between the control and the cellobiofructose sample.

In addition, the panel noticed a better consistency in the sorbet according to the invention, which liquefied less quickly than the control sorbet.

EXAMPLE 5

A control vanilla ice cream was prepared with eggs and saccharose according to the following recipe:

Vanilla ice cream made with eggs (control):
100 g of saccharose
500 ml of semi-skimmed milk
20 g of skimmed-milk powder
40 g of Trimoline R (invert sugar)
1 g of apple pectin
half a vanilla pod
3 egg yolks (60 g eggs)
40 g of fresh cream A test vanilla ice cream (made with eggs) was prepared according to the same operating method, by simple replacement of the 100 g of saccharose by 100 g of cellobiofructose obtained according to the process described by S. HESTRIN and G. AVIGAD.

According to a trained panel of 10 people, there was no significant difference in taste between the test preparation and the control preparation.

The panel also found that a better consistency was present in the test preparation.

EXAMPLE 6

A control brioche containing saccharose was prepared according to the following recipe:

Brioche (control):
20 g of saccharose
7.5 g of bakers's yeast
250 g of flour (type 45)
5 g of salt 2 60 g eggs
100 g of butter
4 tablespoonfuls of water A test brioche was prepared according to the same operating method by simple replacement of the 20 g of saccharose by 20 g of cellobiofructose obtained according to the process described by S. HESTRIN and G. EVIGAD.

According to a trained panel of 10 people, there was no significant difference between the test preparation and the control preparation.

EXAMPLE 7

A control genoese sponge containing saccharose was prepared according to the following recipe:

Genoese sponge (control):
100 g of saccharose
3 eggs
50 g of flour
50 g of Difal biscuit powder A test genoese sponge was prepared according to the same operating method by simple replacement of the 100 g of saccharose by 100 g of cellobiofructose obtained according to the process described by S. HESTRIN and G. AVIGAD.

EXAMPLE 8

A control cream pastry containing saccharose was prepared according to the following recipe:

Cream pastry (control):
100 g of saccharose
500 ml of semi-skimmed milk
1 60 g egg
1 egg yolk
20 g of flour
20 g of Difal cream powder A test cream pastry was prepared according to the same operating method by simple replacement of the 100 g of saccharose by 100 g of cellobiofructose obtained according to the process described by S. HESTRIN and G. AVIGAD, supplemented by 0.6 g of Aspartame ®.

A trained panel of 10 people observed no significant difference in taste between the 2 preparations.

A discussion of beta bonding between glucoside units in a glucose molecule can be found in *Modern Organic Chemistry*, J. D. Roberts et al. (W.R. Benjamin, Inc., 1967).

We claim:

1. Fructosyl oligosaccharides for use in dietetic reduction of the total daily energy intake; said fructosyl oligosaccharides having 3 to 8 carbohydrate units joined by beta bonds with the final carbohydrate unit being a fructose molecule and the remaining carbohydrate units being glucose molecules.

2. Fructosyl oligosaccharides as claimed in claim 1, wherein the fructosyl oligosaccharides are selected from the group consisting of gentiobiofructose, laminaribiofructose, sophorofructose and cellobiofructose and mixtures thereof.

3. An improved dietetic product for use in a method for the reduction of the total daily energy intake in a human or animal subject which comprises at least one edible ingredient combined with a calorific sweetener; wherein the improvement comprise replacement of all or a part of the calorific sweetener with a fructosyl oligosaccharide; said fructosyl oligosaccharide having 3 to 8 carbohydrate units joined by beta bonds with the final carbohydrate unit being a fructose molecule and the remaining carbohydrate units being glucose molecules.

4. A dietetic product as claimed in claim 4 wherein the fructosyl oligosaccharides containing from 3 to 8 carbohydrate units joined by beta bonds are present in an amount of 5% or greater by weight.

5. A dietetic product as claimed in claim 4, wherein the fructosyl oligosaccharides containing from 3 to 8 carbohydrate units joined by beta bonds are present in an amount of 5-70% by weight.

6. A dietetic product as claimed in claim 3 wherein the fructosyl oligosaccharides are selected from the group consisting of cellobiofructose, gentiobiofructose, laminaribiofructose or sophorofructose.

7. A dietetic product as claimed in claim 6, wherein the fructosyl oligosaccharides are selected from the group consisting of cellobiofructose or gentiobiofructose.

8. A dietetic product as claimed in claim 7, wherein the fructosyl oligosaccharides are gentiobiofructose.

* * * * *